(12) United States Patent
Chen et al.

(10) Patent No.: US 8,184,018 B2
(45) Date of Patent: May 22, 2012

(54) IMAGE-BASED VEHICLE SAFETY WARNING SYSTEM

(75) Inventors: Homer H. Chen, Taipei (TW); Hao-Wei Chu, Taipei (TW)

(73) Assignee: National Taiwan University, Taipei (TW)

( * ) Notice: Subject to any disclaimer, the term of this patent is extended or adjusted under 35 U.S.C. 154(b) by 602 days.

(21) Appl. No.: 12/398,565

(22) Filed: Mar. 5, 2009

(65) Prior Publication Data
US 2010/0090863 A1   Apr. 15, 2010

(30) Foreign Application Priority Data
Oct. 14, 2008   (TW) ................................ 97139309 A

(51) Int. Cl.
*G08G 1/00* (2006.01)
(52) U.S. Cl. ......... 340/901; 340/435; 340/933; 382/106
(58) Field of Classification Search .................. 340/435, 340/436, 937, 933, 901; 342/69; 382/106
See application file for complete search history.

(56) References Cited

U.S. PATENT DOCUMENTS

| | | | | | |
|---|---|---|---|---|---|
| 5,289,321 | A | * | 2/1994 | Secor | 359/896 |
| 5,424,952 | A | * | 6/1995 | Asayama | 701/200 |
| 6,067,111 | A | * | 5/2000 | Hahn et al. | 348/148 |
| 6,553,130 | B1 | * | 4/2003 | Lemelson et al. | 382/104 |
| 7,190,281 | B2 | * | 3/2007 | Nagasawa et al. | 340/903 |
| 7,194,347 | B2 | * | 3/2007 | Harumoto et al. | 701/45 |
| 7,640,108 | B2 | * | 12/2009 | Shimizu et al. | 701/301 |
| 7,783,403 | B2 | * | 8/2010 | Breed | 701/45 |
| 7,792,329 | B2 | * | 9/2010 | Schofield et al. | 382/104 |
| 7,817,848 | B2 | * | 10/2010 | Sakata et al. | 382/159 |
| 2008/0042812 | A1 | * | 2/2008 | Dunsmoir et al. | 340/435 |
| 2008/0167819 | A1 | * | 7/2008 | Breed | 701/300 |

* cited by examiner

*Primary Examiner* — Eric M Blount
(74) *Attorney, Agent, or Firm* — Peter F. Corless; Steven M. Jensen; Edwards Wildman Palmer LLP

(57) ABSTRACT

An image-based vehicle safety warning system is disclosed, which uses an image retrieval module for receiving an image signal and camera parameters related to the source of the image signal into a space definition module, which defines an image space and warning areas of different levels in the image space. Then, an object identification module identifies parts of a possible vehicle in the image according to the image signal and variations thereof. A warning indication module then obtains an interrelation by locating the position of the vehicle within the image space and comparing the vehicle position with the warning areas, thereby providing alarms in different levels based on the interrelation.

18 Claims, 3 Drawing Sheets

IMAGE-BASED VEHICLE SAFETY WARNING SYSTEM

FIELD OF THE INVENTION

The present invention relates to vehicle safety warning systems, and more particularly, to an image-based vehicle safety warning system utilizing image processing technology.

BACKGROUND OF THE INVENTION

Vehicle safety assisting devices generally refer to devices that autonomously determine hazardous road factors for drivers, and maintain vehicles in safe and normal driving mode through mechanical and/or electronic apparatuses when approaching the hazards, or raise warning for drivers to return to safe driving mode in order to avoid accidents.

In traditional vehicle safety assisting technologies, ultra-sonar sensors are used for detecting front and/or back objects in close proximity.

Schematic diagrams illustrating operations and reflective detection of a conventional ultra-sonar warning system are shown, respectively, in FIGS. 1a and 1b. As shown, an ultra-sonar sensor 10 is disposed at the back of a car 1 for sending out an ultra-sonar signal 11a. If an object, such as another car 12 appears at the back of the car 1, the ultra-sonar signal 11a will be blocked by the car 12, and a reflected ultra-sonar signal 11b will be generated and received by the ultra-sonar sensor 10 that computes the distance between cars 1 and 12 by examining the energy of the reflected signal 11b and its arrival time. Thereafter, different types of warning signals can be sent depending on how close the object is to the car 1. For example, the closer the object is to the car 1, the louder the alarm or the brighter the warning light or the more the light bars will be.

However, a disadvantage of the conventional ultra-sonar sensor 10 is that the area that can be sensed is quite small, which limits applications to only situations like short distance or slow motion. This is because the signal strength of the ultra-sonar signal 11a decreases significantly with the increase of transmission distance. As a result, vehicle safety warning systems built on ultra-sonar sensors has limited sensing range. Furthermore, due to the limited sensing range, if the system is used in fast moving applications, the time for the drivers to react is very short, and the warning does not give enough buffer time for the drivers to respond to the imminent hazard that is about to happen.

In addition, conventional vehicle safety warning systems that are built on ultra-sonar sensors only provide an approximation of how close the driver's vehicle is to the neighboring object, there is no visual information to help the driver to assess the danger.

Therefore, there is a need for an image-based vehicle safety warning system that allows ample time for drivers to react to imminent road hazards, while further providing visual information for determining road safety.

SUMMARY OF THE INVENTION

In light of the forgoing drawbacks, the present invention is to provide an image-based vehicle safety warning system, which increases the size of detectable warning areas and the buffer time for the driver to react to any impending hazardous event. Additionally, the visual information taken by the camera can be used by the driver as a more intuitive reference during driving.

The present invention provides an image-based vehicle safety warning system, comprising: an image retrieval module for receiving an image signal and camera parameters of an image signal source; a space definition module for defining an image space based on the camera parameters of the source of the image signal and defining warning areas in the image such that each of the warning areas has a specific warning levels; an object identification module for identifying the appearance of another vehicle based on the image signal and the variations thereof; and a warning indication module for determining an identified location of the vehicle within the image space, determining an interrelation between the identified location of the vehicle and the warning area with the specific warning level, and providing a specific level of alarm based on the interrelation.

The image-based vehicle safety warning system may further include a camera, either video or still camera, installed at the back of the vehicle to obtain images, and converts them into image signals. The camera is connected with the image retrieval module so as to transmit the image signals to the image retrieval module.

The camera parameters of the source of the image signal include intrinsic parameters and extrinsic parameters. The intrinsic parameters include, for example, the focal length, coordinate transformation parameters, and aspect ratio of camera. The extrinsic parameters include, for example, the actual distance between the camera and the road surface, the distance between the camera and the vehicle, and the angle of the camera.

The camera may further include a parameter storage unit and a parameter adjusting unit. The parameter storage unit stores the intrinsic parameters and the extrinsic parameters and transmits them to the image retrieval module. The parameter adjusting unit automatically determines and adjusts the intrinsic parameters and the extrinsic parameters and transmits them to the image retrieval module.

The object identification module may determine road surface information by recording and analyzing texture, color, or relative motion of a road right at the back of the vehicle equipped with the image-based vehicle safety warning system, and may further determine all possible zones that do not belong to the road and then identify other vehicles based on texture, size, color, or relative motion of the image zone.

The warning indication module may further include a warning parameter storage unit and a warning parameter adjusting interface. The warning parameter storage unit can be used for storing and transmitting warning definition parameters to the space definition module, such that the space definition module defines warning areas with these warning definition parameters. The warning parameter adjusting interface can be used for adjusting and transmitting warning definition parameters to the space definition module, such that the space definition module defines warning areas with these warning definition parameters.

Additionally, the image-based vehicle safety warning system of the present invention may include a driving parameter module for providing driving parameters related to the vehicle equipped with the image-based vehicle safety warning system, such that the warning indication module can adjust the level of warning according to the driving parameters.

The image-based vehicle safety warning system of the present invention may also include a mobile information storage module, an infrared image module and/or a radar sensing module. The mobile information storage module can be used to store, for example, the image signals taken by the camera and information about speed, direction and acceleration of driving. The infrared image module may assist the camera in extracting infrared visual information under poor visibility. The radar sensing module may assist in determining the relative positions of the vehicle equipped with the image-based vehicle safety warning system of the present invention and the other cars.

In summary, the image-based vehicle safety warning system of the present invention employs the image retrieval module for receiving an image signal and camera parameters related to a source of the image signal into the space definition module, which defines an image space and warning areas of different levels in the image space. Then, the object identification module identifies parts of possible vehicles in the image according to the image signal and variations thereof. The warning indication module then obtains an interrelation by locating the position of the vehicle within the image space and comparing the vehicle position with the warning areas, thereby providing alarms in different levels based on the interrelation.

Since the present invention determines an interrelation between an object (e.g. another car) near the car equipped with the image-based vehicle safety warning system of the present invention and the various warning areas by image identifying and image space construction mechanisms, signal attenuation in the ultra-sonar reflective detecting technique of the prior art can be eliminated, thereby increasing the size of the detectable areas and the buffer time for the drivers to react to any impending hazardous event. Additionally, the visual information taken by the camera can be used as a more intuitive reference during driving.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE EMBODIMENTS

The present invention is described by the following specific embodiments. Those with ordinary skills in the arts can readily understand the other advantages and functions of the present invention after reading the disclosure of this specification. The present invention can also be implemented with different embodiments. Various details described in this specification can be modified based on different viewpoints and applications without departing from the scope of the present invention.

[First Embodiment]

Figure 1A:
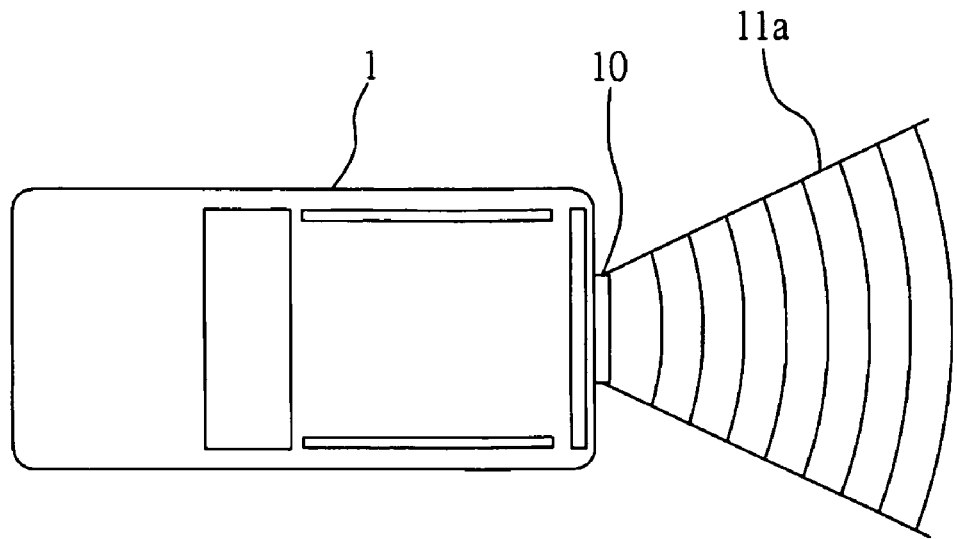
FIG. 1a is a schematic diagram illustrating operations of a conventional ultra-sonar warning system.
Figure 1B:
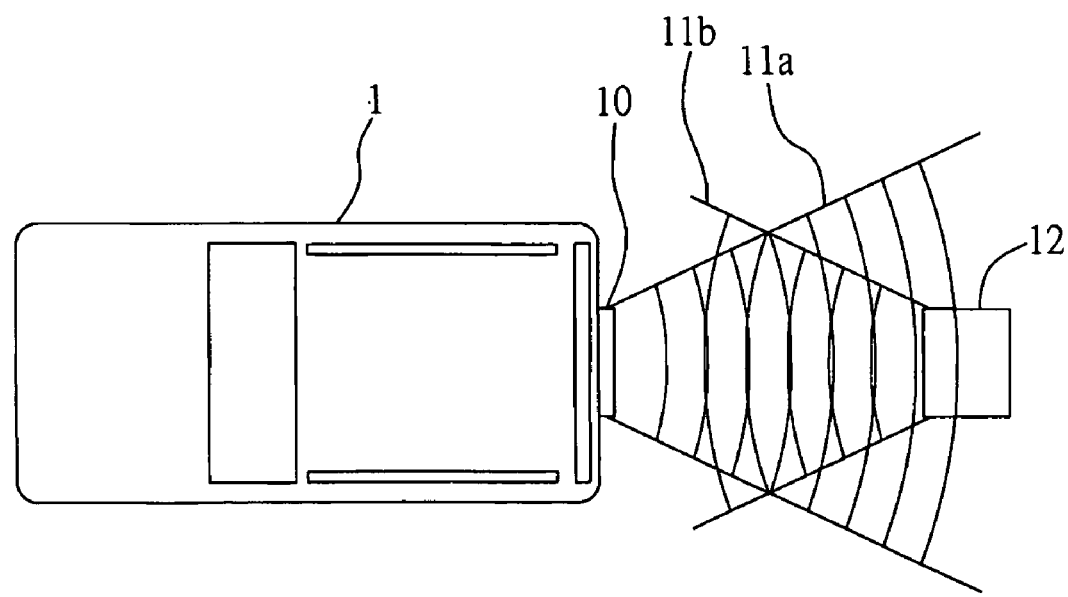
FIG. 1b is a schematic diagram illustrating reflective detection of a conventional ultra-sonar warning system.
Figure 2:
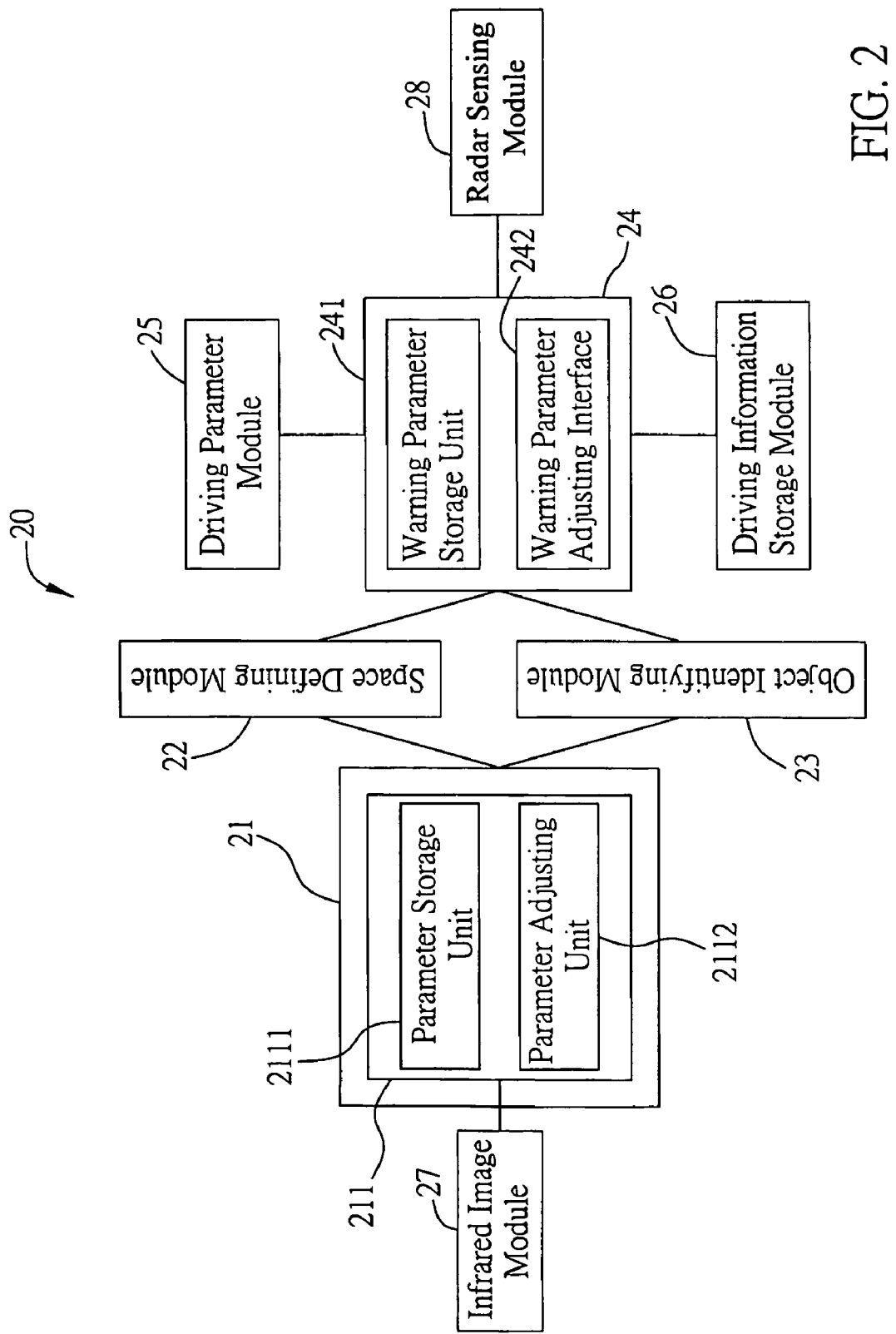
FIG. 2 is a block diagram depicting the basic structure of an image-based vehicle safety warning system according to an embodiment of the present invention.

Refer to FIG. 2, where a block diagram depicting the basic structure of an image-based vehicle safety warning system 20 according to an embodiment of the present invention is shown. The image-based vehicle safety warning system 20 of the present invention includes an image retrieval module 21, a space definition module 22, an object identification module 23 and a warning indication module 24.

The image retrieval module 21 is used for receiving image signals from a source and camera parameters of the source of the image signal. The space definition module 22 is used for defining an image space using the image signals and the camera parameters, and defining each of warning areas with a specific warning level in the image space. The object identification module 23 is used to identify the appearance of vehicles in the image space using the image signals and the variations thereof. The warning indication module 24 determines the position of the vehicle (objects) identified in the image space and interrelates the position of the identified vehicle with one or more of the warning areas individually with the specific warning level, thereby alarms in different levels can be given based on the interrelations.

The image-based vehicle safety warning system 20 of the present invention may include a video camera 211 equipped at the back of the vehicle installed with the image-based vehicle safety warning system 20 for obtaining images. The video camera 211 is connected to the image retrieval module 21. The video camera 211 can send the images to the image retrieval module 21. Preferably, the video camera 211 is a digital video camera or any video acquisition devices that is capable of converting analog image signals into digital image signals.

The video camera 211 includes a parameter storage unit 2111 and a parameter adjusting unit 2112. The parameter storage unit 2111 stores intrinsic and extrinsic parameters of the video camera 211, and transmits the intrinsic and extrinsic parameters to the image retrieval module 21 when the image-based vehicle safety warning system 20 of the present invention is activated. The parameter adjusting unit 2112 is used for automatically determining and adjusting the intrinsic and extrinsic parameters of the video camera 211 and sending them to the image retrieval module 21.

The intrinsic parameters include, for example, the focal length, coordinate transformation parameters, and aspect ratio of the video camera 211. The extrinsic parameters include, for example, the actual distance between the video camera 211 and the road surface, the distance between the video camera 211 and the vehicle and the angle of the video camera 211.

The image retrieval module 21 receives and transmits the intrinsic and extrinsic parameters of the video camera 211 sent by the parameter storage unit 2111 and the parameter adjusting unit 2112 and the image signals to the space definition module 22, which then defines an image space based on the intrinsic and extrinsic parameters of the source of the image signal and the image signals.

Figure 3A:
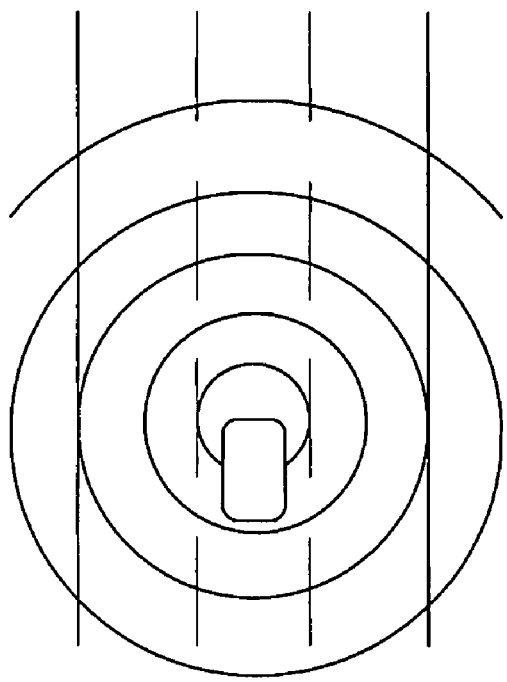
FIG. 3a is a diagram illustrating road surface information retrieved by a camera in the first embodiment of the present invention.
Figure 3B:
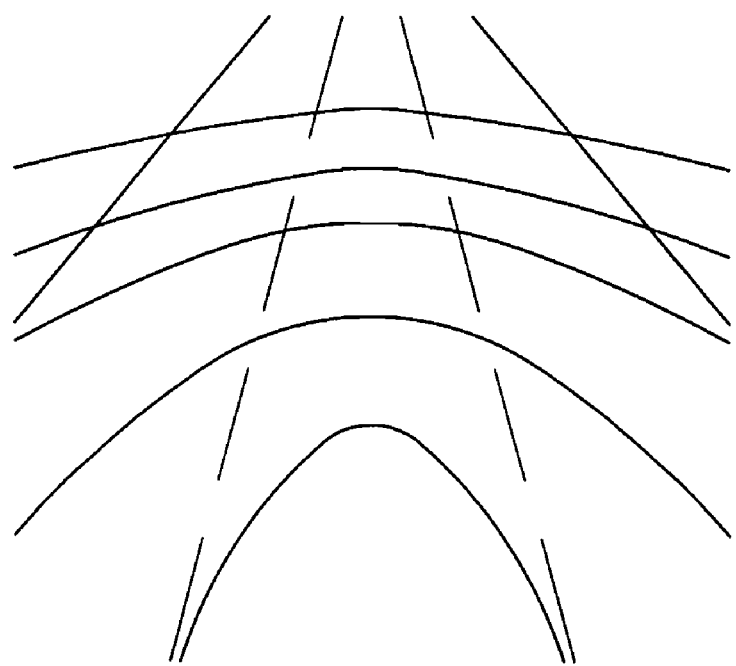
FIG. 3b is a diagram illustrating corresponding road surface information retrieved by a camera in the first embodiment of the present invention.

FIGS. 3a and 3b illustrate the concept regarding interrelating an image constructed based on these parameters with the image space of the actual world. FIG. 3a is a diagram illustrating road surface information retrieved by the video camera 211 in the first embodiment of the present invention. This picture and related information are interrelated with correct camera parameters to define a corresponding image space as shown in FIG. 3b.

The operation concept of the image-based vehicle safety warning system 20 of the present invention includes retrieving image signals by the image retrieval module 21 and allowing camera parameters of the source of the image signal to be input into the space definition module 22, the camera parameters referring to the intrinsic and extrinsic parameters used for manipulating the video camera 211.

Thereafter, the space definition module 22 defines areas with different warning levels in the image space based on the camera parameters of the source of the image signal. The object identification module 23 then identifies a portion in the image that could be a vehicle based on the image signals and the variations thereof.

Finally, the warning indication module 24 determines the position of the vehicle in the image space and interrelates this position with the areas of different warning levels, and based on this interrelation, different levels of warning can be given.

The warning indication module 24 includes a warning parameter storage unit 241 and a warning parameter adjusting interface 242. The warning parameter storage unit 241 stores warning definition parameters and transmits the warning definition parameters to the space definition module 22 when the image-based vehicle safety warning system 20 of the present invention is activated, such that the space definition module 22 can mark warning areas using these warning definition parameters.

The warning parameter adjusting interface 242 is used for manually adjusting the warning definition parameters and transmits them to the space definition module 22, such that the space definition module 22 can mark warning areas using these warning definition parameters and return the warning area information back to the warning indication module 24.

It should be noted that there are many ways the warning areas can be marked. One simple way is by drawing concentric circles using the video camera 211 as the center of the concentric circles. The closer the area is to the center, the higher the level of warning to which the area is associated becomes. Alternatively, division of the warning areas may take vehicle directions into account. For example, the left back lane, the direct back lane, or the right back lane with respect to the vehicle itself may have different warning levels. In other words, division of the warning areas may be determined based on safety considerations and actual driving conditions. The present invention is not so limited.

In addition, the image-based vehicle safety warning system 20 of the present invention includes a driving parameter module 25 for adjusting warning level and providing driving parameters to the warning indication module 24, such as the speed, direction and/or acceleration information about the car equipped with the image-based vehicle safety warning system 20 of the present invention. Thereby, the warning indication module 24 can adjust the level of warning according to the various driving parameters associated with the car equipped with the image-based vehicle safety warning system 20 of the present invention in the warning areas.

The object identification module 23 determines the road surface information by recording and analyzing road texture, color and relative motion, and determines image zones that do not belong to roads and then identifies other cars based on the texture, size, color, and image variations of said image zones. The information related to other cars can then be sent to the warning indication module 24.

Upon receiving the image space information and warning area information from the space definition module 22 and receiving information about roads and other cars at the back of the car from the object identification module 23, the warning indication module 24 may raise different levels of warning based on the level of danger. For example, the closer the another car or object is to the car equipped with the image-based vehicle safety warning system 20 of the present invention, the louder the alarm or the brighter the warning light or the more the light bars will become.

Furthermore, the image-based vehicle safety warning system 20 of the present invention may also employ assisting apparatuses, such as a mobile information storage module 26, an infrared image module 27 and/or a radar sensing module 28. The mobile information storage module 26 is used to store, for example, the image signals and information about speed, direction and acceleration of driving, as well as operation-related data of other modules. The infrared image module 27 may be selectively installed to the camera 211 for assisting the camera 211 in extracting infrared visual information and utilizing the infrared visual information as operating signal, in particular, under poor visibility. The radar sensing module 28 is used to assist in determining the relative positions of the car equipped with the image-based vehicle safety warning system 20 of the present invention and the other cars.

In summary, the image-based vehicle safety warning system 20 of the present invention employs the image retrieval module 21 for receiving an image signal and camera parameters related to the source of the image signal into the space definition module 22, which defines an image space and warning areas of different levels in the image space. Then, the object identification module 23 identifies parts of possible vehicles in the image according to the image signal and variations thereof. The warning indication module 24 then obtains an interrelation by locating the position of the vehicle within the image space and comparing the vehicle position with warning areas, thereby providing alarms in different levels based on the interrelation.

Since the present invention determines an interrelation between an object (e.g. another car) near the car equipped with the image-based vehicle safety warning system 20 of the present invention and the various warning areas by image identifying and image space construction mechanisms, signal attenuation in the ultra-sonar reflective detecting technique of the prior art can be eliminated, thereby increasing the size of the detectable areas and the buffer time for the drivers to react to any impending hazardous event. Additionally, the visual information taken by the camera can be used as a more intuitive reference during driving.

[Second Embodiment]

The second embodiment is similar to the first embodiment, except that the image space constructed by the image-based vehicle safety warning system 20 in this embodiment is a virtual 2-D space system, wherein the image space, warning areas, road surface information and other cars are all 2-D objects in a 2-D space system.

However, considerable resource is required for building such a 2-D system. The image-based vehicle safety warning system 20 of the present invention may reduce implementation cost by obtaining data related to different warning areas, road and other cars based on the image space and camera parameter information, and performing analysis and processing on the obtained data.

The above embodiments are only used to illustrate the principles of the present invention, and they should not be construed as to limit the present invention in any way. The above embodiments can be modified by those with ordinary skills in the art without departing from the scope of the present invention as defined in the following appended claims.

What is claimed is:

1. An image-based vehicle safety warning system, comprising:
   an image retrieval module for receiving an image signal from a source and allowing camera parameters of the source of the image signal to be input;
   a space definition module for defining an image space based on the camera parameters of the source of the image signal and for defining warning areas in the image space individually with a specific warning level;

an object identification module for identifying an appearance of a vehicle in the image space based on the image signal and variations of the image signal; and a warning indication module for determining an identified location of the vehicle in the image space, determining an interrelation between the identified location of the vehicle and at least one of the warning areas individually with the specific warning level in the image space, and providing a specific level of alarm corresponding to the interrelation, wherein the warning indication module further comprises a warning parameter adjusting interface for adjusting and transmitting warning definition parameters to the space definition module, such that the space definition module defines the warning areas based on the warning definition parameters.

2. The image-based vehicle safety warning system of claim 1, wherein the source of the image signal comprises a camera connected with the image retrieval module for taking and transmitting the image signal to the image retrieval module.

3. The image-based vehicle safety warning system of claim 2, further comprising a mobile information storage module for storing the image signal taken by the camera.

4. The image-based vehicle safety warning system of claim 2, wherein the source of the image signal further comprises an infrared image module for enabling the camera to retrieve infrared visual information.

5. The image-based vehicle safety warning system of claim 1, further comprising a mobile information storage module for storing information related to at least one of speed, direction, and acceleration of a vehicle equipped with the image-based vehicle safety warning system.

6. The image-based vehicle safety warning system of claim 2, wherein the camera parameters of the source of the image signal include at least one of a focal length, coordinate transformation parameters, and pixel aspect ratio of the camera, an actual distance between the camera and a road surface, a distance between the camera and a vehicle equipped with the image-based vehicle safety warning system, and the angle of the camera.

7. The image-based vehicle safety warning system of claim 2, wherein the camera further comprises a parameter adjusting unit for automatically determining and adjusting the camera parameters and inputting the camera parameters to the image retrieval module.

8. The image-based vehicle safety warning system of claim 7, wherein the warning areas individually with the specific warning level are defined in the image space by forming projections on a two-dimensional space based on a corresponding relationship between the image space and the camera parameters.

9. The image-based vehicle safety warning system of claim 1, wherein the object identification module is further for determining road surface information in the image signal and identifying the vehicle in the image space.

10. The image-based vehicle safety warning system of claim 9, wherein the object identification module determines the road surface information by recording and analyzing at least one of texture, color and image variation modes of the road surface right behind the vehicle.

11. The image-based vehicle safety warning system of claim 10, wherein the object identification module determines an image zone other than the road surface and then identifies the vehicle based on at least one of texture, size, color and image variation modes of the image zone.

12. The image-based vehicle safety warning system of claim 1, wherein the warning indication module further comprises a warning parameter storage unit for storing the warning definition parameters.

13. The image-based vehicle safety warning system of claim 1, further comprising a driving parameter module for providing driving parameters related to a vehicle equipped with the image-based vehicle safety warning system, such that the warning indication module adjusts the specific level of alarm according to the driving parameters.

14. The image-based vehicle safety warning system of claim 13, wherein the driving parameters include at least one of speed, direction and acceleration information about the vehicle equipped with the image-based vehicle safety warning system.

15. The image-based vehicle safety warning system of claim 1, further comprising a radar sensing module for assisting in determining relative positions of the vehicle equipped with the image-based vehicle safety warning system and the vehicle in the image space.

16. An image-based vehicle safety warning system, comprising:

an image retrieval module for receiving an image signal from a source and allowing camera parameters of the source of the image signal to be input;

a planar defining module for defining an image space based on the camera parameters of the source of the image signal and defining warning areas in the image space individually with a specific warning level;

an object identification module for identifying the appearance of another vehicle based on the image signal and the variations thereof; and a warning indication module for determining an identified location of a vehicle in the image space, determining an interrelation between the identified location of the vehicle and at least one of the warning areas individually with the specific warning level in the image space, and providing a specific level of alarm corresponding to on the interrelation, wherein the source of the image signal comprises a video camera including a parameter adjusting unit for automatically determining and adjusting the camera parameters and inputting the camera parameters to the image retrieval module.

17. The image-based vehicle safety warning system of claim 16, wherein the object identification module determines road surface information by recording and analyzing at least one of texture, color and image variation modes of the road surface right behind the vehicle in the image space.

18. The image-based vehicle safety warning system of claim 16, wherein the warning indication module further comprises a warning parameter storage unit for storing and transmitting warning definition parameters to the space definition module, such that the space definition module defines the warning areas based on the warning definition parameters.

* * * * *